Patented May 29, 1934

1,960,329

UNITED STATES PATENT OFFICE 1,960,329

COLORING CERAMIC MATERIALS

George H. Brown, Highland Park, N. J., assignor to Metal & Thermit Corporation, Carteret, N. J., a corporation of New Jersey No Drawing. Application September 25, 1931, Serial No. 565,200

4 Claims. (Cl. 106—36.2)

This invention relates to tinting ceramics; and it comprises as a new composition of matter for tinting ceramics in yellow hues a fired mixture of rutile and a relatively small proportion of zirconia or zircon; and it also comprises a process of producing a tinting material for ceramics, giving yellow hues free of reddish or pinkish nuances, wherein fine powdered rutile is admixed with a less amount of fine powdered zirconia or zircon and the mixture is fired at a temperature of the order of 2200° F., the mixture being then cooled and re-ground; all as more fully hereinafter set forth and as claimed.

Titanium oxid, $TiO_2$, in a pure state is white, and it is frequently used as a white pigment for painting purposes. The native oxid, rutile, is reddish in color, or, sometimes, brown or black. For some reason, however, either pure titanium oxid or rutile, if incorporated into clay and the ordinary ceramic mixtures, gives ivory or yellowish tints. It is therefore much used in the various ceramic industries as a colorant, or, more exactly, a hue-giving body. In the usual proportions, it does not give any distinctive color; it merely gives hue. For example, ordinary pure porcelain materials made into floor tiles give a staring white. In the presence of a little titanium oxid or rutile, this white is modified into an ivory hue which is more agreeable to the eye. For similar reasons, a little rutile is added to the artificial tooth compositions to give an off-white color nearer the appearance of a natural tooth. It has, however, been found that the use of rutile in this way sometimes gives nuances in reddish and pinkish which are undesirable. In other words, in obtaining hues which are darker than the usual ivory, there may be a nuance in red or pink.

I have found that by the use of a certain composite pigment containing some zirconia, this production of undesirable reddish nuances by rutile may be avoided and fuller toned ivory hues obtained. The new pigment has greater tinctorial powers than rutile and can be used in relatively larger proportions without producing reddish or pinkish nuances; proportions sufficient to give not only ivory hues, but also tan and golden shades.

Zirconia and its silicate, zircon, can also be used in ceramic materials for giving off-white shades, and a physical mixture of zirconia (or zircon) with rutile does not give results materially different from either or from the sum of their results, but by firing a mixture of fine powdered rutile and fine powdered zirconia or zircon to a high temperature, a temperature sufficient to cause chemical reaction an agglomerated material is obtained which, on powdering, gives me a colorant for ceramic materials having the new properties described. I assume that a zirconium titanate is formed, although I customarily use the zirconia admixture in an amount less than that corresponding to the theoretical requirement for zirconium titanate; i. e., I use an excess of rutile.

In practice, I fine powder rutile or commercial titanium oxid and admix with it 5 to 25 per cent of added fine powdered zirconia or zircon. The admixture is next calcined or heated at a high heat in any convenient type of furnace. I avoid using reducing gases because of a darkening of the $TiO_2$, due to reduction. A temperature of about 2200° F. for two hours is suitable. The mixture may be put into an ordinary crucible and heated in any ordinary furnace, or it may be briquetted and exposed to flame heat, avoiding reducing conditions. The mixture does not melt, but it clinkers and agglomerates, more or less. The fired mixture is cooled and powdered, forming my new tinting agent. In making the initial mixture and in powdering the fired mixture, fine grinding should be used. Powdering to at least 100 mesh is desirable in both cases. It may be used as a component for glazes.

The new colorant may be used in tinting and hueing all the ordinary ceramic goods, such as wall tile, tableware, porcelain ware, sanitary ware, brick, terra cotta, artificial teeth, etc.

The new preparation has great tinctorial power and extremely small additions are all that are required to give ivory and yellow tints to ordinary ceramic goods of the classes described. With greater additions, the ivory tint becomes a golden or a full tan, as may be desired; in all cases, without the ordinary pinkish or reddish nuances given with rutile alone. I ordinarily employ from 0.25 to 15 per cent of the new preparation in admixture with clay or other ceramic raw materials and compositions. The particular amount depends on the result desired. The addition of 0.5 per cent of the new tinting agent to the composition used in making a white vitreous floor tile, imparts to the tile a light cream color. Raising the addition to 2 per cent, gives a stronger ivory cream. By increasing the amount to 5 per cent of the tinting agent on the ceramic composition, tan and golden colors are secured.

What I claim is:—

1. In the process of manufacturing ceramic materials varying in color from full toned ivory to a tan and free from red nuances, the step which comprises adding to said ceramic materials as a tinting agent prior to firing a pre-fired mixture of native rutile with a small proportion of a zirconium compound, the mixture being added in proportions ranging from about 0.25 to 15 per cent by weight.

2. The process of claim 1 wherein the content of the zirconium compound in said tinting agent amounts to about 5 to 25 per cent of the rutile present.

3. The process of claim 1 wherein the mixture of rutile and zirconium compound is pre-fired to temperatures of the order of 2200° F., followed by cooling and fine grinding.

4. The process of claim 1 wherein the zirconium compound is selected from a class consisting of zirconia and zircon.

GEORGE H. BROWN.